(12) United States Patent
Otani et al.

(10) Patent No.: US 9,023,424 B2
(45) Date of Patent: May 5, 2015

(54) PROCESS FOR PRODUCING PHOTOCHROMIC OPTICAL ARTICLES

(75) Inventors: Toshiaki Otani, Shunan (JP); Hironobu Nagoh, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 866 days.

(21) Appl. No.: 12/306,797

(22) PCT Filed: Jun. 29, 2007

(86) PCT No.: PCT/JP2007/063068
§ 371 (c)(1),
(2), (4) Date: Dec. 29, 2008

(87) PCT Pub. No.: WO2008/001875
PCT Pub. Date: Jan. 3, 2008

(65) Prior Publication Data
US 2009/0324956 A1   Dec. 31, 2009

(30) Foreign Application Priority Data

Jun. 30, 2006   (JP) ................................ 2006-180516

(51) Int. Cl.
*B29D 11/00* (2006.01)
*C08J 7/04* (2006.01)
*G02B 5/23* (2006.01)

(52) U.S. Cl.
CPC . *G02B 5/23* (2013.01); *C08J 7/047* (2013.01); *C08J 2369/00* (2013.01)

(58) Field of Classification Search
USPC ......... 427/162, 163.1, 164; 264/1.1, 1.7, 1.32
See application file for complete search history.

(56) References Cited

U.S. PATENT DOCUMENTS

| | | | |
|---|---|---|---|
| 5,316,791 A | 5/1994 | Farber et al. | |
| 6,372,355 B1 | 4/2002 | Noda et al. | |
| 7,951,445 B2 | 5/2011 | Izumi et al. | |
| 2003/0020869 A1 | 1/2003 | Leclaire et al. | |
| 2004/0220292 A1 | 11/2004 | Momoda et al. | |
| 2005/0041298 A1 | 2/2005 | Toda et al. | |
| 2006/0269741 A1 | 11/2006 | Izumi et al. | |

FOREIGN PATENT DOCUMENTS

| | | |
|---|---|---|
| AU | 2005223188 B2 | 9/2005 |
| EP | 1 602 479 A1 | 12/2005 |
| JP | 11-302598 A | 11/1999 |
| JP | 2001-288412 A | 10/2001 |
| JP | 2004-170500 A | 6/2004 |
| JP | 2005-274938 A | 10/2005 |
| KR | 10-1999-0066302 A | 8/1999 |
| KR | 10-2001-0032590 A | 4/2001 |
| WO | WO-03/011967 A1 | 2/2003 |
| WO | WO-2004/078476 A1 | 9/2004 |

OTHER PUBLICATIONS

Search Report and Written Opinion dated Aug. 19, 2010 for Singapore Application No. 200809549-9.
Korean Office Action, dated Mar. 16, 2011, for Korean Application No. 10-2008-7031239.
Extended European Search Report for European Application No. 07767855.5, dated Aug. 28, 2013.

*Primary Examiner* — Mathieu D. Vargot
(74) *Attorney, Agent, or Firm* — Birch, Stewart, Kolasch & Birch, LLP

(57) ABSTRACT

Provided is a method for producing a photochromic optical article having a photochromic coating layer exhibiting photochromism formed on an optical base such as a plastic lens which has good optical characteristics and photochromic characteristics, and also has good adhesion between the base and the photochromic layer. The method enables to easily produce such a photochromic optical article by improving wettability of a photochromic coating agent for a primer. In this method, the photochromic optical article is produced by forming a primer layer on the optical base surface by coating a primer comprising an emulsion which has a colloidally dispersed urethane resin in a dispersion medium, and then forming on the primer layer.

5 Claims, No Drawings

US 9,023,424 B2

PROCESS FOR PRODUCING PHOTOCHROMIC OPTICAL ARTICLES

TECHNICAL FIELD

The present invention relates to a process for producing optical articles such as a photochromic plastic lens or the like.

TECHNICAL BACKGROUND

A photochromic eyeglass has such properties that in the outdoors where lights including ultraviolet ray such as sunlight are irradiated, its lens colors speedily and thereby it functions as a sunglass, while in the interior where such lights are not irradiated, its lens discolors and thereby it functions as a normal eyeglass. The demand of the photochromic eyeglass has been increased in recent years.

Known examples of a process for producing a plastic lens having photochromic properties are a method for impregnating the surface of a lens having no photochromic properties with a photochromic compound (hereinafter referred to impregnating process), a method of coating the surface of a plastic lens with a coating agent which comprises a curable composition having photochromic properties (hereinafter referred to photochromic coating agent) and then curing, and thereby providing a resin layer having photochromic properties (photochromic coat layer) (hereinafter referred to coating method), and a method for producing a photochromic lens directly by dissolving a photochromic compound in a monomer and polymerizing them (hereinafter referred to in-mass method). Among these methods, the coating method has an advantage capable of simply giving photochromic properties to any lens substrates in principle as compared with the other two methods. For example, in the impregnating method, it is necessary to use a soft substrate in which a photochromic compound can be easily diffused, as a substrate lens. In the in-mass method, it is necessary to use a special monomer composition in order to exhibit good photochromic properties. However, the coating method does not have such a restriction on substrates.

As a process for producing a photochromic lens by the coating method, there is a known method of using, as a photochromic coating agent, a curable composition which comprises a radical polymerizing monomer containing a radical polymerizing monomer having a silanol group or a group capable of generating a silanol group by hydrolysis, an amine compound, and a photochromic compound in specific amounts (referred to Patent Document 1). There is, furthermore, a known method of using, as an adhesive primer, a polyurethane resin layer which comprises a cured material of a moisture curable polyurethane resin and/or its precursor in order to improve adhesion in the case of using the photochromic coating agent (referred to Patent Document 2). When a photochromic coating lens is produced by using the composition described in Patent Document 1 as a photochromic coating agent and directly applying the composition on a substrate, the adhesion of a photochromic coat layer with some kinds of substrates is sometimes lowered and come away in an accelerated test with boiling that high temperature and high humidity conditions are assumed. When the above adhesion primer is used, the adhesion is improved and thereby film separation can be prevented.

Patent Document 1: International Publication 03/011967 Pamphlet
Patent Document 2: International Publication 04/078476 Pamphlet

DISCLOSURE OF THE INVENTION

Object of the Invention

However, in the method disclosed in Patent document 2, when a substrate which surface is easily immersed in applying a primer, such as an optical substrate made of polycarbonate is used, the substrate surface is necessary to be previously coated with a crosslinking film such as hard coat layer before applying a primer. Moreover, after forming a primer layer, it is revealed that a photochromic coating agent is hardly immersed in the primer layer. Therefore, when a photochromic coating agent is applied with a spin coating method, uncoated portions where the coating agent does not adhere are induced on the primer layer surface and thereby the yield is occasionally lowered.

Under the circumstances, it is an object of the invention to provide a process for adhering a photochromic coat layer having good photochromic properties with a substrate such as plastic lens firmly and stably using a primer without affecting the coating properties of a photochromic coating agent.

Means for Solving the Subject

It is generally known that the wetting properties of a surface are improved by applying etching treatment. Therefore, various etching methods for a primer layer (for example, physical etching method such as plasma or corona etching; and chemical etching methods with acid or basic substances) have been conducted, but sufficient effects cannot be obtained.

Therefore, the present inventors have been studied on various primers in order to find a primer capable of forming a primer layer having good wetting properties for a photochromic coating agent and also capable of bonding a photochromic layer with a substrate well. They found that good results are obtained using an emulsion containing a urethane resin as a primer. Thus, the present invention has been accomplished.

The first invention is a process for producing an optical article comprising a laminate structure consisting of an optical substrate, a photochromic layer formed from a coating solution containing a photochromic compound and a primer layer therebetween, wherein the surface of the optical substrate and the photochromic layer are bonding through the primer layer, which process comprises the steps of:

(A) forming the primer layer on the surface of the optical substrate by applying a primer comprising an emulsion containing an urethane resin; and (B) forming the photochromic layer on the primer layer formed in the step (A).

The second invention is a process for producing the optical article according to the first invention wherein the primer is an emulsion containing a urethane resin having at least one group selected from a silanol group, an acryloyloxy group, a methacryloyloxy group and an epoxy group.

The third invention is a process for producing the optical article according to the first invention or second invention, wherein the primer is an emulsion containing a urethane resin having a skeleton derived from polycarbonate polyol.

The fourth invention is a process for producing the optical article according to the first invention wherein the process comprises forming the primer layer by applying the primer with a spin coating method in the step (A) and forming the photochromic layer by applying a photochromic coating solution with a spin coating method in the step (B).

The fifth invention is an optical article obtainable by the production process described in the first invention.

The sixth invention is an optical article in which an optical substrate is formed from polycarbonate, obtainable by the production process described in the first invention.

Effect of the Invention

According to the production process of the present invention, using an emulsion containing a urethane resin as an adhesive primer, a substrate such as plastic lenses for eyeglasses and a photochromic layer can be properly bonded without deterioration of coating properties in applying a photochromic coating agent. The primer used in the invention is an emulsion type and can make a primer layer by a simple drying method by only removing a dispersion medium. In conventional moisture curable type primers which are cured by a reaction, it is necessary to control the curing conditions before applying a photochromic coating agent, while the primer of the present invention has a merit such that it is unnecessary to control the curing conditions. Moreover, since the dispersing medium used in the emulsion type primer is basically an aqueous type, it is unnecessary in the present invention to cover with a crosslinking film such as a hard coat layer before applying the primer even if using a substrate made from a material having low solvent resistance such as polycarbonate or the like.

In the case of using the emulsion type primer, the adhesion strength is occasionally lower as compared with using the moisture curable type primer. However, in the case of using a primer made from an emulsion containing a urethane resin having a specific group, high adhesion strength can be obtained, and a substrate and a photochromic layer can be properly bonded with firm adhesion properties so as to resist a severe test, for example, boiling.

In the case of using a primer made from a emulsion containing a urethane resin having a skeleton derived from polycarbonate, the urethane resin is apt to have a glass transition temperature (Tg) of from 0 to 100° C., and the stress relaxation of a resulting primer layer is high because the urethane resin has Tg in the above range. Furthermore, a photochromic coat layer can be properly bonded without curing at a high temperature in forming the photochromic coat layer. On these account, even when a thick photochromic coat layer having a thickness of from 20 to 50 μm is formed on a thin substrate having a large difference in thickness between the center and the periphery and having a center thickness of lower than 1 mm, excellent optical articles having little distortion caused by deformation can be prepared because deformation of a substrate caused by stress in polymerization shrinkage and deformation in heat curing are not invited.

Due to the urethane resin having Tg in the above range, the time required to dry a coated primer can be shortened. When the primer layer is dried insufficiently, the wetting properties are tends to be lowered in applying the photochromic coating agent. When the primer layer is wholly covered by spin coating, it is necessary to use a larger amount of the photochromic coating agent, while when the emulsion containing the urethane resin having a skeleton derived from polycarbonate is used, good wetting properties can be obtained even if the drying time is shortened, and thereby it is unnecessary to increase the amount of the photochromic coating agent used.

Furthermore, the process of the present invention can provide optical articles having not only excellent optical properties and photochromic properties, but also good mechanical properties such as impact resistance or the like.

BEST EMBODIMENT FOR CARRYING OUT THE INVENTION

In the production process of the present invention, on at least one surface of an optical substrate such as plastic lens substrate or the like (herein, the optical substrate means a substrate having a pair of front and back main surfaces made from an optical material), a primer layer is formed using an emulsion containing a urethane resin, and on the primer layer, a photochromic layer is formed. The primer layer formed using the emulsion containing the urethane resin has good wetting properties to the photochromic coating agent and is capable of enhancing the adhesion between the optical substrate and the photochromic layer.

It is presumed that the use of the primer made from the emulsion containing the urethane resin leads to such excellent effects due to the presence of a group or an atomic group having surface-active functions in molecules of an emulsifying agent contained in the emulsion or a self-emulsifying type urethane resin.

That is, it is considered that by the presence of the emulsifying agent or the group having surface active functions on the surface of the primer layer made from the urethane resin applied on the surface of an optical substrate as an adhesive primer, the surface tension of the interface of the primer layer with the photochromic coating agent coated thereon is lowered. It is also considered that the wetting properties of the primer surface are improved by the functions of a little amount of water present on the surface.

Optical Substrate

The optical substrates used in the invention have particularly no limitation as long as they have optical transmission properties. Examples thereof may include glasses and plastic lenses and known optical substrates such as window glasses for houses or automobiles. It is particularly preferred to use plastic lenses.

Examples of the plastic lenses used in the invention are known ones, which are used as a plastic lens now, namely, thermoplastic resin lenses such as (meth)acrylic resin and polycarbonate resin lenses; and crosslinking resin lenses such as polyfunctional (meth)acrylic resin, allyl resin, thiourethane resin, urethane resin and thioepoxy resin lenses. In the production process of the present invention, the surface where the urethane resin emulsion primer will be applied is preferably fabricated from a three-dimensional crosslinked material. Since the aqueous emulsion containing a urethane resin, however, hardly dissolves a thermoplastic resin as compared with a solvent type primer, the production process of the present invention can be used suitably for plastic lenses made from the thermoplastic resin such as polycarbonate resin or the like. Furthermore, an optical substrate on whose surface a silicon or acrylic hard coat layer formed may be used as the optical substrate. Moreover, an optical substrate subjected to a treatment such as etching can be also used.

Primer Made of Urethane Resin-Containing Emulsion

The urethane resin-containing emulsion used as the adhesive primer in the present invention may be any of an oil in water type (O/W type) and a water in oil type (W/O type). Emulsions containing a dispersed urethane resin in a colloidal particle state or a more bulky particle state in a water or a dispersing medium which comprises a mixture of an organic solvent having high affinity with water and a water are preferable in that it is unnecessary to use an organic solvent which attacks the substrate and the emulsions are easy to handle because the viscosity of those can be easily lowered.

In the case the dispersing medium of the emulsion comprises a mixture of an organic solvent having high affinity with water and a water, examples of the organic solvent used may include alcohols such as methanol, ethanol and isopropyl alcohol; glycols such as ethylene glycol, propylene glycol, and butyl glycol; their ethers; N-methyl pyrrolidone; dimethyl sulfoxide; and methoxy propyl acetate. The content of these organic solvents is usually from 0.1 to 50% by mass based on the total mass of the emulsion, and preferably 1 to 10% by mass for maintaining the adhesion or appearance.

Since the dispersed particle diameter (average particle diameter) of the urethane resin in the emulsion depends on the kind of the urethane resin, the kind of the emulsifying agent optionally used and the emulsifying method, it cannot be defined categorically. But, from the viewpoint of good wetting properties of the coat layer formed, the dispersed particle diameter is preferably less than 1000 nm, while from the viewpoint of the optical transparency of the primer layer, it is preferably less than 500 nm, particularly preferably less than 100 nm.

The urethane resin contained in the emulsion which is the primer used in the present invention means a polyurethane resin obtainable by allowing a compound having isocyanate groups present in the molecule to react with a compound having active hydrogen, and is a generic name for a polymer having a urethane, urea, carbamic acid, amine, amide, allophanate, biuret, carbodimide, uretonimine, urethodione or isocyanurate structure in the molecule. The above urethane resin may be a urethane resin having a blocked isocyanate group. Examples of the blocked isocyanate groups are ϵ-caprolactam, butanone oxine, 1,2-pyrazole, 1,2,4-triazole, diisopropanol amine, 3,5-dimethyl pyrazole and diethylmalonate.

Examples of the isocyanate group-having compound suitably usable as the raw material of the polyurethane resin are:
(1) aromatic isocyanate compounds such as tolylene diisocyanate, 4,4-diphenylmethane diisocyanate, xylylene diisocyanate, 1,5-naphthalene diisocyanate, toluidine diisocyanate, phenylene diisocyanate, 4,4-diphenyldiisocyanate, dianicidine diisocyanate, 4,4-diphenylether diisocyanate, triphenylmethane triisocyanate or tris(isocyanatephenyl) thiophosphates and tetramethylxylene diisocyanate;
(2) aliphatic isocyanate compounds such as trimethylhexamethylene diisocyanate, hexamethylene diisocyanate, isophorone diisocyanate, hydrogenated 4,4-diphenylmethane diisocyanate, hydrogenated xylene diisocyanate, lysine diisocyanate, lysine ester triisocyanate, 1,6,11-undecane triisocyanate, 1,8-diisocyanate-4-isocyanate methyloctane, 1,3,6-hexamethylene triisocyanate and bicycloheptane triisocyanate;
(3) polyisocyanate compounds or polyisocyanate oligomer compounds obtainable by combining these aromatic isocyanate compounds and/or these aliphatic isocyanate compounds with an active hydrogen-having compound in a combining ratio such that the isocyanate compounds remain by various methods;
(4) polyisocyanates containing at least one or more sulfur atoms or halogen atoms in the molecule; and
(5) modified products of the above polyisocyanates, biuret, isocyanurate, allophanate and carbodiimide.

Concerning the active hydrogen-having compound suitably used as a raw material of the polyurethane resin, examples of the active hydrogen-having group may include compounds having an amino group, hydroxyl group and mercapto group. From the viewpoint of the reaction rate with an isocyanate group, hydroxyl group-having compounds are preferable, and further polyol is particularly preferable. The hydroxyl group-having compounds preferably have 2 to 6 functional groups, and particularly preferably have 2 to 4 functional groups from the viewpoint of maintaining good film properties of the primer.

Examples of the hydroxyl group-having compounds are (1) polyester polyol, (2) polyether polyol, (3) polyether ester polyol, (4) polyester amide polyol, (5) acryl polyol, (6) polycarbonate polyol, (7) polyhydroxy alkane, (8) polyurethane polyol, their mixtures or silicon polyol.

When the urethane resin contained in the emulsion has a glass transition temperature (Tg) of preferably from 0 to 100° C., the primer layer obtained from it has a high stress relaxation force and high temperature curing is unnecessary in forming the photochromic coat layer, moreover, the quick drying properties are excellent. When the urethane resin has a skeleton derived from polycarbonate polyol, it is preferred in the present invention to use (6) polycarbonate polyol as a raw material of the urethane resin because the Tg can be easily set to the above range.

(1) Examples of the polyester polyol may include polyester polyols obtainable by allowing a dibasic acid such as terephthalic acid, isophthalic acid, adipic acid, azelaic acid or sebacic acid, or a dialkyl ester thereof or a mixture thereof to react with a glycol such as ethylene glycol, propylene glycol, diethylene glycol, butylene glycol, neopentyl glycol, 1,6-hexane glycol, 3-methyl-1,5-pentadiol, 3,3'-dimethylol heptane, polyoxyethylene glycol, polyoxypropylene glycol or polytetramethylene etherglycol, or a mixture thereof; and polyester polyols obtainable by ring opening polymerizing lactones such as polycaprolactam, polyvalerolactone or poly(β-methyl-γ-valerolactone).

(2) Examples of the polyether polyol may include polyether polyols obtainable by polymerizing an oxirane compound such as ethylene oxide, propylene oxide, butylene oxide or tetrahydrofuran, using, as an initiator, water or a low molecular weight polyol such as ethylene glycol, propylene glycol, trimethyol propane or glycerin.

(3) Examples of the polyether ester polyol may include polyether ester polyols obtained by reacting a dibasic acid such as terephthalic acid, isophthalic acid, adipic acid, azelaic acid or sebacic acid, or a dialkyl ester thereof or a mixture thereof with the above polyether polyol.

(4) Examples of the polyester amide polyol may include those obtained by adding a raw material of an aliphatic diamine having amino groups such as ethylene diamine, propylene diamine or hexamethylene diamine to the raw material of the polyesterification reacted product and reacting them on the polyesterification reaction.

(5) Examples of the acryl polyol may include those obtained by copolymerizinig a polymerizable monomer having one hydroxyl group in one molecule such as hydroxyethyl acrylate, hydroxypropyl acrylate, hydroxybutyl acrylate or their corresponding methacrylic acid derivatives with acrylic acid, methacrylic acid or their esters.

(6) Examples of the polycarbonate polyol may include those obtained by reacting one or two glycols selected from the group consisting of ethylene glycol, propylene glycol, 1,3-propane diol, 1,4-butane diol, 1,5-pentane diol, 1,6-hexane diol, 3-methyl-1,5-pentane diol, 1,9-nonane diol, 1,8-nonane diol, neopentyl glycol, diethylene glycol, dipropylene glycol, 1,4-cyclohexane diol, 1,4-cyclohexane dimethanol, bisphenol A and hydrogenated bisphenol A with dimethyl carbonate, diphenyl carbonate, ethylene carbonate or phosgene.

(7) Examples of the polyhydroxy alkane may include liquid rubbers obtained from isoprene or butadiene, or obtained by copolymerizing butadiene with acrylamide.

(8) Examples of the polyurethane polyol may include polyols having a urethane bond in one molecule. Examples of those may include those obtained by reacting polyether polyol, polyester polyol or polyether ester polyol, each having a molecular weight of 200 to 5000 with an isocyanate group-containing compound having at least two isocyanate groups in one molecule, in a mole number ratio of NCO group to OH group of less than 1, preferably not more than 0.9.

Furthermore, low molecular weight polyols may be mixed in addition to the above hydroxyl group-having compounds.

Examples of the low molecular weight polyols may include glycols used for the production of polyester polyols such as ethylene glycol, propylene glycol, 1,3-propane diol, 1,4-butane diol, 1,5-pentane diol, 1,6-hexane diol, 1,9-nonane diol, 1,8-nonane diol, neopentyl glycol, diethylene glycol, dipropylene glycol, 1,4-cyclohexane diol or 1,4-cyclohexane dimethanol, glycerin, trimethylol propane and pentaerythritol. Moreover, it is possible to simultaneously use monols such as a methanol, a ethanol, propanols, butanols, 2-ethylhexanol, lauryl alcohol or stearyl alcohol.

The urethane resin contained in the emulsion has a molecular weight (number average molecular weight) of preferably from 5,000 to 5,000,000, and specifically from 100,000 to 200,000 from the viewpoint of bonding strength between the primer layer obtained from it and photochromic coat layer. From the viewpoint that the primer layer obtained from it has excellent adhesion and high stress relaxation functions, the urethane resin has a glass transition point (Tg) of preferably from 0 to 100° C., more preferably 20 to 90° C. Tg can be easily measured, for example, using a specimen obtainable by applying the emulsion and drying.

In order to emulsify the urethane resin, it is essential that the urethane resin is a self-emulsifying urethane which has an ionic or nonionic functional group or an atomic group having a surface active function (emulsifying function) in the resin structure, or the urethane resin is forcedly emulsified with an emulsifying agent. From the viewpoint of maintaining the good wet properties of the primer layer to the photochromic coating agent for a long time, the urethane resin contained in the emulsion is preferably the self-emulsifying type.

The group or atomic group having a surface active function which is contained in the self-emulsifying urethane resin is not particularly limited as long as it is a group or atomic group having high affinity with water and capable of emulsifying the urethane resin in water. Preferable examples of the group or the atomic group are a group or an atomic group having an anionic surface-active function such as a sulfonyl group or a carboxyl group, or their alkali metal salts, alkyl amine salts or amine salts; a group having a nonionic surface-active function such as a hydroxyl group or a polyalkylene glycol; and a group or an atomic group having a cationic surface-active function such as an amino group or an alkyl amino group, or their sulfonic acid salts or alkyl sulfonic acid salts. Among them, the emulsion containing the self-emulsifying urethane resin having the group or the atomic group of an anionic surface-active function, especially containing a an alkyl amine salt of carboxylic acid in the urethane resin structure is preferably used, because the emulsion has relatively high stability and the resulting photochromic lens has good durability.

In the preparation of the self-emulsifying urethane resin-containing emulsion, an introducing method of the group having a surface-active function typically includes a method of reacting a hydrophilic group-containing compound with the isocyanate group-containing compound and neutralizing with a neutralizing agent, and thereby preparing the group or atomic group having a surface active function.

Examples of the hydrophilic group-containing compounds may include compounds having at least one active hydrogen group in the molecule and also having a hydrophilic group such as a carboxyl group, a sulfonic acid group, a sulfonate group, an epoxy group or a polyoxy alkylene group.

Examples of the hydrophilic group-containing compounds may include sulfonic acid-containing compounds such as 2-oxyethane sulfonic acid, phenol sulfonic acid, sulfobenzoic acid, sulfosuccinic acid, 5-sulfoisophthalic acid, sulfanilic acid, 1,3-phenylene diamine-4,6-disulfonic acid or 2,4-diaminotoluene-5-sulfonic acid, or derivatives thereof or polyester polyols obtainable by copolymerizing these compounds; carboxyl group-containing compounds such as 2,2-dimehylol propionic acid, 2,2-dimethylol butyric acid, 2,2-dimethylol valeric acid, dioxymaleic acid, 2,6-dioxy benzoic acid or 3,4-diamino benzoic acid, and derivatives thereof; and carboxyl group-containing compounds obtained by reacting an active hydrogen group-having compound with an acid anhydride such as maleic anhydride, phthalic anhydride, succinic anhydride, trimellitic anhydride or pyromellitic anhydride, and derivatives thereof. In the preparation of the urethane resin emulsion, these hydrophilic group-containing compounds can be used singly or in combination of two or more kinds.

In the case of using the compounds containing an anionically hydrophilic group such as carboxyl group or sulfonic group, it is preferred to use a neutralizing agent in order to dissolve or disperse a resulting polyurethane resin satisfactorily.

Examples of the neutralizing agents may include tertiary amines such as ammonia, triethyl amine, triethanol amine, triisopropanol amine, trimethyl amine or dimethyl ethanol amine; alkali metals such as sodium hydroxide, potassium hydroxide or calcium hydroxide; and hydroxides of alkali earth metals. These can be used singly, or in combination of two or more kinds.

As the emulsifying agent used for emulsifying the urethane resin forcedly, it is possible to use a nonionic emulsifying agent, an anionic emulsifying agent, a cationic emulsifying agent, an amphoteric emulsifying agent or a protective colloid type compound which comprises a surface active agent such as carboxylic acid methyl cellulose or polyvinyl alcohol. These emulsifying agents may be also added to the emulsion containing the self-emulsifying urethane resin. The wetting properties of the primer to the substrate can be improved by such an emulsifying agent.

Known nonionic emulsifying agents can be used as the nonionic emulsifying agent. Examples thereof may include polyoxyethylene alkylether, polyoxyethylene polyoxypropylene alkylether, polyoxyethylene alkylphenylether, polyoxyethylene polyoxypropylene alkylphenylether, polyoxyethylene glycol, polyoxyethylene polyoxypropyleneglycol, polyoxypropylene glycol, polyoxyethylene aliphatic acid ester, polyoxyethylene sorbitan aliphatic acid ester, sorbitan aliphatic acid ester, glycerin aliphatic acid monoester, sucrose aliphatic acid ester, aliphatic acid alkanol amide, polyoxyethylene alkylamide, polyoxyethylene polyoxypropylene alkylamide, polyoxyethylene alkylaminoether, polyoxyethylene polyoxypropylene alkylaminoether, polyoxyethylene acetylene glycol, polyoxyethylene polyoxypropylene acetylene glycol, alkyl phosphoric acid ester salt, acetylene alcohol and polyether modified dialkyl polysiloxane copolymer. Two or more of these emulsifying agents may be combined for use.

Known anionic emulsifying agents can be used as the anionic emulsifying agent. Examples thereof may include alkylaryl sulfonate, alkyl sulfonate, dialkyl sulfosuccinate, polyoxyethylene alkylaryl phosphate, polyoxyethylene alkylaryl ether sulfate, alkylnaphthalene sulfonate, polyoxyethylene styryl phenylether sulfate and alkyl sulfate. Two or more of these emulsifying agents may be combined for use.

Known cationic emulsifying agents can be used as the cationic agent. Examples thereof may include monoalkyl amine and salts thereof, alkyltrimethyl amine and salts thereof, dialkyldimethyl amine and salts thereof, imidazolinium and salts thereof, alkylbenzyl dimethyl quaternary ammonium and salts thereof, benzyl pyridinium and salts thereof, alkyl pyridinium and salts thereof, and polyoxyethylene alkylbenzyl ammonium and salts thereof. Two or more of these emulsifying agents may be combined for use.

Known amphoteric emulsifying agents can be used as the amphoteric emulsifying agent. Examples thereof may include N,N-dimethyl-N-alkyl-N-carboxymethyl ammonium betaine, N,N-dialkylaminoalkylene carboxylate and N,N,N-trialkyl-N-sulfoalkylene ammonium betaine. Two or more of these emulsifying agents may be combined for use.

In order to prepare the primer used in the present invention, the urethane resin is emulsified by the usual method. For example, when the anionic self-emulsifying urethane emulsion is prepared, the polyisocyanates compound is allowed to react with polyol and carboxylic acid group-having polyol to synthesize an isocyanate terminated pre-polymer having a carboxylic acid structure in the molecule, and then the pre-polymer is neutralized with alkylamine and added into water and emulsified, and then chain-extended by a polyamino compound, thereafter, the residual organic solvent is distilled off and thereby the urethane resin-containing emulsion is prepared.

The use of the urethane resin-containing emulsion as an adhesive primer provides good bonding between the substrate such as plastic lenses for eyeglasses and the photochromic layer without deteriorating the coating properties in applying the photochromic coating agent on the primer layer. Although the adhesion on that occasion is higher than the adhesion without having the primer layer, it is sometimes lower than the adhesion by using a primer of a moisture-curing type urethane resin, depending on the kind of urethane resin contained in the emulsion. The present inventors have been studied on the urethane resins contained in the emulsions in order to solve these problems. As a result, they found that when a specific functional group is introduced into the urethane resin, it is possible to obtain the adhesion same as that in the use of the primer of the moisture-curing type urethane resin.

Firstly, the present inventors found that high adhesion strength can be obtained stably in the case of using an adhesive primer comprising the emulsion containing the urethane resin having at least one group selected from a silanol group, a group capable of producing a silanol group by hydrolysis, an acryloyloxy group, a methacryloyloxy group and epoxy group, and using, an adhesive photochromic coating agent such as the agent containing an amine compound (for example, amine compounds other than hindered amine, such as triethanol amine), as a photochromic coating agent, and thereby, for example, the substrate and the photochromic layer can be satisfactorily bonded with firm adhesion resistant to a severe test such as boiling or the like. Secondly, they found that when an adhesive primer formed from an emulsion containing a urethane resin having at least one group selected from the acryloyloxy group and methacryloyloxy group among the above specific groups is used, the high adhesion strength same as the above case can be realized in using not only the photochromic coating agent containing the amine compound but also the photochromic coating agent free from the amine compound.

Therefore, in the process of the present invention, it is preferred to use the primer which comprises the emulsion containing a urethane resin having a least one group selected from the group consisting of a silanol group, a group capable of preparing a silanol group by hydrolysis, an acryloyloxy group, a methacryloyloxy group and epoxy group on the condition that the adhesive photochromic coating agent containing an amine compound other than hindered amine, such as triethanol amine, as described later, is used. Among of these, from the viewpoint of ease of manufacture, it is further preferred to use the emulsion containing the urethane resin having at least one group selected from a silanol group, a group capable of preparing a silanol group by hydrolysis, an acryloyloxy group and a methacryloyloxy group, and it is most preferred to use the emulsion containing the urethane resin having at least one group selected from a silanol group and an acryloyloxy group.

Furthermore, when the photochromic coating agent free from an amine compound such as triethanol amine, as described later, is used, it is preferred to use the emulsion containing the urethane resin having at least one group selected from an acryloyloxy group and a methacryloyloxy group. In this emulsion, the urethane resin may further have at least one group selected from the group consisting of a silanol group, a group capable of preparing a silanol group by hydrolysis and an epoxy group. When the acryloyloxy group and/or a methacryloyloxy group coexist with these groups, it is preferred to coexist with the silanol group because of ease of manufacture.

The amounts of these specific groups can be represented by the total mmol of these specific groups contained in 100 g of the urethane resin, wherein total mmol is a value determined by dividing the total number of the specific groups contained 100 g of the urethane resin by Avogadro's number and multiplying the quotient by 1000. These specific groups are contained in an amount of preferably from 0.5 to 200 mmol/100 g-urethane resin, particularly preferably from 1 to 100 mmol/100 g-urethane resin. When the urethane resin has at least one group selected from an acryloyloxy group and a methacryloyloxy group, the amount of these groups is preferably from 1 to 50 mmol/100 g-urethane resin. Moreover, when the emulsion containing the urethane resin is an anionic self-emulsifying urethane emulsion, the amount of these groups is preferably from 0.1 to 5 equivalents, more preferably from 0.5 to 2 equivalents on the basis of a functional group and an atomic group having a surface active function.

As the method of introducing these specific groups into the urethane resin, it is possible to employ the following method. That is to say, the method disclosed in JP-A-H9(1997)-12864 can be used as the method of introducing a silanol group and a group capable of preparing a silanol group by hydrolysis. In the above method, by reacting a compound having at least two active hydrogen groups in one molecule (compound A), a compound having at least two isocyanate groups in one molecule (compound B), and a compound having at least one active hydrogen group capable of reacting with at least one isocyanate group in one molecule and a hydrolyzing silicon group (compound C), the urethane resin having a silanol group and/or a group capable of preparing a silanol group by hydrolysis is prepared. Specifically, after an isocyanate terminated prepolymer having a carboxylic acid structure in the molecule is synthesized by reacting a polyisocyanate compound (compound B), a polyol (compound A) and a polyol having a carboxylic acid group (compound A), the prepolymer is neutralized with alkylamine and the resulting prepolymer is added into water and emulsified, and then, the compound C and a chain extender are dissolved therein to extend the chain, and then the organic solvent remained is distilled off and thereby the emulsion containing the urethane resin having a silanol group and/or a group capable of preparing a silanol group by hydrolysis is prepared.

As the compound C, it is preferred to use a hydrolyzing silicon group-containing compound having an amino group as an active hydrogen group capable of reacting with an isocyanate group, and having an alkoxy group as a hydrolyzing silicon group. Examples of the compound are γ-(2-aminoethyl)aminopropyl trimethoxy silane, γ-(2-aminoethyl) aminopropyl triethoxy silane, γ-(2-aminoethyl)aminopropyl methyl dimethoxy silane, γ-(2-aminoethyl)aminopropyl methyl diethoxy silane, γ-aminopropyl trimethoxy silane, γ-aminopropyl triethoxy silane, γ-aminopropyl methyl dimethoxy silane and γ-aminopropyl methyl diethoxy silane. Of these compounds, it is preferred to use the compound having at least two active hydrogen groups. When the compounds are used, the hydrolyzing silicon group can be introduced into the intermediate part of the molecule of the polyurethane resin and the properties such as weathering resistance and solvent resistance are improved. The compound C is used in an amount such that the proportion of active hydrogen group in the hydrolyzing silicon group-containing compound to residual isocyanate group in the isocyanate terminated prepolymer is preferably from 0.05 to 1.0, more preferably 0.1 to 0.8.

When an acryloyloxy group, a methacryloyloxy group or an epoxy group is introduced as the specific group, a compound having a terminal hydroxyl group and an acryloyloxy group (processed compound D), a compound having a terminal hydroxyl group and a methacryloyloxy group (compound E), or a compound having a terminal hydroxyl group and an epoxy group (compound F) is used in place of the compound C in the above method, and a residual isocyanate group in the isocyanate prepolymer is reacted with the terminal hydroxyl group in these compounds. As the compounds D and E, (meth)acrylate compounds wherein (meth)acrylate means acrylate and/or methacrylate, such as 2-hydroxyethyl acrylate, 2-hydroxyethyl methacrylate, polyethyleneglycol (meth)acrylate, polypropyleneglycol(meth)acrylate, polybutyleneglycol(meth)acrylate, polytetramethyleneglycol (meth)acrylate can be used. As the compound F, glycidol, sorbitol polyglycidyl ether having a terminal hydroxyl group and trimethylol propane polyglycidylether having a terminal hydroxyl group can be used. The compounds D to F are used in an amount such that the proportion of terminal hydroxyl group in the compounds to residual isocyanate group on the isocyanate terminated prepolymer is preferably from 0.05 to 1.0, more preferably 0.1 to 0.8.

The amount of each of the specific groups, which are introduced in the urethane resin, can be regulated by controlling the amount of each of the compounds C to F used.

The urethane resin contained in the emulsion used in the process of the present invention has the above specific groups and moreover, preferably has a crosslinking structure prepared by reacting three-functional or four-functional polyol with an isocyanate group.

The emulsion containing such a urethane resin is available commercially or as a reagent. Examples thereof are as follows.

(1) Examples of the urethane resin emulsion free from the above specific groups are TakelacW-615, Takelac W-6010, Takelac W-6020, Takelac W-6061, Takelac W-511, Takelac W-405, Takelac W-7004, Takelac W-605, Takelac W-512A6, Takelac W-635 and Takelac W-5030, manufactured by Mitsui Chemicals Polyurethanes INC., and Bayhydrol PR135, Bayhydrol PR240, Bayhydrol PR340, Bayhydrol VPLS2952, Bayhydrol VPLS2341, Bayhydrol VPLS2342, Baybond 400S, Baybond401 and Bayhydrol PT241, manufactured by Sumitomo Bayer Urethane Co., Ltd.

(2) Examples of the urethane resin emulsion having a silanol group or a group capable of preparing a silanol group by hydrolysis in the urethane resin are Takelac WS-5000, Takelac WS-5100, Takelac WS-4000, Takelac WS-6021, manufactured by Mitsui Chemicals Polyurethanes, INC.

(3) Examples of urethane resin emulsion having an acryloyloxy group and/or a methacryloyloxy compound in the urethane resin are BayhydrolUV VPLS2280, BayhydrolUV VPLS2282 and BayhydrolUV VPLS2317 manufactured by Sumitomo Bayer Urethane INC.

The urethane resin-containing emulsion used as the primer in the present invention may comprise the dispersing medium, the urethane resin and the emulsifying agent optionally used, and further may comprise inorganic fine particles. The emulsion can have improved surface hardness by containing the inorganic fine particles. Examples of the inorganic compounds constituting the fine particles may include silicon oxide compounds such as silicon dioxide; aluminum oxide compounds such as aluminum trioxide; titanium oxide compounds such as titanium dioxide; zirconium oxide compounds such as zirconium dioxide; tin oxide compounds such as tin dioxide; and antimony oxide compounds such as antimony trioxide and antimony pentaoxide. Furthermore, it is preferred to use the inorganic fine particles having an average particle diameter of from 1 to 300 nm, particularly 1 to 200 nm. These inorganic fine particles are available as colloidal silica or various sols commercially. The emulsion contains the inorganic fine particles in an amount of preferably not more than 30% by mass, more preferably not more than 10% by mass based on the total mass of the emulsion.

As the method of forming the primer layer on the surface of an optical substrate by applying the primer made from the urethane resin-containing emulsion, it is preferred to employ a method such that the primer made from the urethane resin-containing emulsion is applied on at least one surface of the optical substrate and then liquid components such as the dispersing medium or the like in the emulsion are removed by drying.

In applying the primer made from the urethane resin-containing emulsion on an optical substrate such as a plastic lens substrate or the like, a pretreatment for the substrate is preferably carried out before applying in order to improve the adhesion. Examples of the pretreatment are degreasing treatment by an organic solvent; chemical treatment by basic aqueous solutions such as sodium oxide aqueous solution or potassium hydroxide aqueous solution, sulfuric acid aqueous solution, or hydrochloric acid aqueous solution; polishing treatment using a polishing agent; plasma treatment using atmospheric pressure plasma or low pressure plasma; corona discharging treatment; flame treatment; and UV ozone treatment. Among these pretreatments, it is preferred to employ the degreasing treatment by an organic solvent, the alkali treatment, the plasma treatment or the corona discharging treatment, and treatment by combining these treatments from the viewpoint of the adhesion of the optical substrate with the primer layer. Because of high cleaning effect for the surface of an optical substrate and a high effect of removing materials which make the appearance worse, such as foreign bodies present on the optical substrate surface, it is most preferred to use the optical substrate with warm water for removing alkali components, after etching using a 10 to 20% by mass of sodium hydroxide or potassium hydroxide aqueous solution at a temperature of from 50 to 60° C.

The methods of applying the primer made from the urethane resin emulsion on the surface of an optical substrate are not particularly limited and may include dipping, spin coating, dip spin coating or other methods. Of these, the method of spin coating the urethane resin-containing emulsion is preferable because a coating film having good appearance can be prepared. In the case of applying the primer by the spin coating method, the primer kept in a vessel is flown from a nozzle and dropped on the optical substrate surface, and thereafter, the primer dropped is spread over the over all surface with centrifugal force by rotating the optical substrate at high speed and also extra primer is removed by scattering. This application is preferably carried out for obtaining good appearance in such a way that while rotating the optical substrate at low speed and moving the nozzle faced to the outside in the radial direction from the center of the optical substrate linearly, the primer is dropped so that the primer dropped draws a spiral form, and after the completion of the dropping, the substrate is rotated at high speed.

In applying the primer with the spin coating method, the primer is regulated to have a viscosity at 25° C. of preferably from 50 to 300 cP, more preferably 80 to 200 cP, because a primer layer having a uniform thickness can be easily prepared. The regulation of the viscosity can be conducted by changing the kind or the amount of the dispersing medium. Furthermore, the kind of the nozzle used, the outputting rate of the primer, the moving rate of the nozzle, the rotating speed of the optical substrate and other conditions may be determined according to the kinds of the primer and optical substrate used. In the case of applying the primer having a viscosity of from 80 to 200 cP at room temperature on a convex lens having a diameter of 75 mm, it is preferred to employ the following conditions. Namely, the application is preferably carried out in such a way that a nozzle having an inner diameter of from 0.2 mm to 1 mm is used, the flow rate is regulated so that the output linear rate of the primer is from 30 to 200 cm/s, and the nozzle is moved from the lens center to the end at a rate of from 3 to 6 mm/cm. The nozzle is preferably moved while regulating the nozzle position according to the lens shape, so that the distance between the nozzle top and the lens surface is from 1 to 5 mm, preferably 1 to 3 mm. At the time of dropping the primer, the rotating number of the spin is preferably regulated within the spin rotating rate of from 50 to 100 rpm depending on the lens diameter, the nozzle diameter and the outputting rate. When the primer is applied on the surface of a φ75 mm lens by such a method, the primer layer can be formed on the overall lens surface using the primer in a small amount of 1.4 g.

With respect to the thickness of the primer coating film formed on the surface of the optical substrate, the primer layer formed after drying has a thickness of preferably from 0.1 to 30 μm, more preferably 1 to 15 μm, furthermore preferably 5 to 9 μm from the viewpoint of having good optical properties and adhesion (bonding properties) of the primer layer with the photochromic coat layer optionally formed on the layer. From the viewpoint of the optical properties, it is preferred that bubbles are substantially absence in the layer.

In the production process of the present invention, after the urethane resin emulsion primer is applied in the above manner, liquid components such as a dispersing medium and the like are removed by drying and thereby the primer layer may be formed. The drying conditions are not particularly limited, but the drying with heating may be carried out at a temperature of from 70 to 150° C. Specifically, it is preferably carried out at a temperature from 15 to 30° C. for at least 5 min, more preferably for about 15 min because of obtaining firm adhesion.

(Photochromic Coating Agent)

In the production process of the present invention, on the primer layer formed on the surface of the optical substrate, the photochromic coat layer consisting of the resin layer containing the photochromic compound is formed. The photochromic coat layer is formed in such a way that the photochromic coating agent is applied on the primer layer and then cured.

As the photochromic coating agent, a photochromic coating agent usable in a conventional coating method can be used without particular limitation as long as it is a curing composition containing a photochromic compound and a polymerizing monomer. However, from the viewpoint of the photochromic properties, optical properties, and the solvent resistance, scratch resistance and adhesion of the photochromic layer, it is preferred to use the coating agent, which comprises a radical polymerizing monomer (excluding monomers having a silanol group or having a group capable of preparing a silanol group by hydrolysis, and having a maleinide group), a compound having a silanol group or a group capable of preparing a silanol group by hydrolysis and a photochromic compound as essential components in specific amounts, and further, optionally, a radical polymerizing monomer containing a maleimide group and/or an amine compound, as disclosed in the pamphlets of International Publication Nos. 03/011967, 04/050775 and 05/014717.

Examples of the radical polymerizing monomers used in the photochromic coating agent excluding radical polymerizing monomers having a silanol group or having a group capable of preparing a silanol group by hydrolysis, and a radical polymerizing monomer having a maleimide group may include trimethylolpropanetrimethacrylate, trimethylolpropanetriacrylate, tetramethylolmethanetrimethacrylate, tetramethylolmethanetriacrylate, trimethylolpropanetriethyleneglycoltriacrylate, pentaerythritoltetramethacrylate, dipentaerythritolhexacrylate, urethaneoligomer tetracrylate, urethaneoligomer hexamethacrylate, urethaneoligomer hexacrylate, polyesteroligomer hexacrylate, diethyleneglycoldimethacrylate, triethyleneglycoldimethacrylate, tetraethyleneglycoldimethacrylate, tripropyleneglycoldimethacrylate, bisphenol A dimethacrylate, 2,2-bis(4-methacryloyloxyethoxyphenyl)propane, glycidylmethacrylate, 2,2-bis(4-acryloyloxypolyethyleneglycolphenyl)propane having an average molecular weight of 776 and methyletherpolyethylene glycolmethacrylate having an average molecular weight of 475. Although the amount of these other radical polymerizing monomers used in the invention is not particularly limited, it is preferred to use these monomers in an amount of from 20 to 90% by mass, particularly 40 to 80% by mass based on the mass of the whole coating agent.

Examples of the compounds having a silanol group or a group capable of preparing the silanol group by hydrolysis are γ-methacryloyloxy propyltrimethoxy silane, γ-methacryloyloxy propyltriethoxy silane, γ-methacryloyloxy propylmethyl dimethoxy silane, (3-acryloyloxypropyl)dimethylmethoxy silane, (3-acryloyloxypropyl)methyldimethoxy silane, (3-acryloyloxypropyl)triethoxy silane, (methacryloyloxymethyl)dimethylethoxy silane, methacryloyloxymethyl triethoxy silane, methacryloyloxymethyltrimethylethoxy silane, methacryloyloxypropyldimethylethoxy silane and methacryloyloxypropyldimethylmethoxy silane. Although the amount of these compounds used in the invention is not particularly limited, it is preferred to use the compound in an amount of from 0.5 to 20% by mass, particularly 1 to 10% by mass based on the mass of the whole coating agent.

Examples of the radical polymerizing monomers containing a maleimide group may include 4,4'-diphenylmethane bismaleimide, bis(3-ethyl-5-methyl-4-maleimidephenyl) methane, 2,2-bis[4-(4-maleimidephenoxy)phenyl]propane, m-maleimidebenzoyl-N-hydroxysuccineimide ester and succineimidyl-4-(N-maleimidemethyl)cyclohexane-1-carboxylate. Although the amount of the radical polymerizing monomer used in the invention is not particularly limited, it is preferred to use the compound in an amount of from 0.05 to 15% by mass, particularly 0.1 to 10% by mass based on the mass of the whole coating agent.

Examples of the amine compound are triethanol amine, N-methyldiethanol amine, triisopropanol amine, N,N-dimethyl aminoethyl methacrylate and N,N-diethylaminoethyl methacrylate. Although the amount of the amine compound used in the invention is not particularly limited, it is preferred to use the amine compound in an amount of from 0.01 to 15% by mass, particularly 0.1 to 10% by mass based on the mass of the whole coating agent.

When the photochromic layer is formed on the primer layer, the amine compound is not an essential component. Even if using a coating agent obtainable by excluding the amine compound from the adhesive photochromic coating agent, the sufficient adhesion capable of enduring for practical use can be obtained. The addition of the amine compound has an effect for improving the adhesion, while it occasionally limits the usable time of the adhesive photochromic coating liquid capable of giving sufficient adhesion. In the process of the present invention, using the adhesive primer composed of the emulsion containing the urethane resin having at least one group selected from the silanol group and the group capable of preparing the silanol group by hydrolysis, and at least one group selected from an acryloyloxy group, a methacryloyloxy group and an epoxy group, the high adhesion can be obtained without addition of the amine compound. Therefore, the usable time of the photochromic coating agent can be extended largely.

Examples of the photochromic compounds used herein are known photochromic compounds such as a naphthopyrane derivative, a cromene derivative, a spirooxadine derivative, a spiropyrane derivative and a flugimide.

These photochromic compounds are disclosed in, for example, JP-A-H2(1990)-28154, JP-A-S62(1987)-288830, the pamphlets of International Publication Nos. 94/22850, 96/14596 and 01/60811, U.S. Pat. No. 4,913,544 and U.S. Pat. No. 5,623,005. Among these compounds, it is preferred to use the photochromic compounds disclosed in the pamphlet of International Publication No. 01-60811, U.S. Pat. No. 4,913,544 and U.S. Pat. No. 5,623,005.

Although the amount of the photochromic compound is not particularly limited, it is preferred to use the photochromic compound in an amount of from 0.1 to 30% by mass, particularly 1 to 10% by mass based on the mass of the whole coating agent.

The photochromic coating agent preferably contains 0.001 to 5 parts by mass of a silicon or fluorine surface-active agent based on the 100 parts by mass of the radical polymerization monomer component. Adding the specific amount of the silicon or fluorine surface active agent, not only the wetting properties to the primer is improved, but also the occurrence of inferior appearance can be prevented without affecting on the photochromic properties or the adhesion of the cured coating film (photochromic layer) at the time of using the composition as the photochromic coating agent. From the viewpoint of the effect, the content of the silicon or fluorine surface active agent is preferably from 0.01 to 2 parts by mass, more preferably 0.02 to 1 part by mass based on 100 parts by mass of the radical polymerizing monomer component.

As the silicon surface-active agent used herein, known surface-active agents having a silicone chain (polyalkylsiloxane unit) as a hydrophobic group can be used without limitation. As the fluorine surface-active agent used herein, surface-active agents having a carbon fluoride chain can be used without limitation. Perfluoroalkyl group-containing ester oligomers, perfluoroalkyl group-containing alkylene oxide adducts and fluorine aliphatic polymer esters can be used.

Specific examples of the silicone surface-active agent and the fluorine surface-active agent preferably used in the present invention may include "L-7001", "L-7002", "1-7604" and "FZ-2123" manufactured by Nippon Unicar Co. Ltd., "MEGAFACE F-470", "MEGAFACE F-1405" and "MEGAFACE F-479" manufactured by DIC Corporation, and "Fluorad FC-430" manufactured by Sumitomo 3M Ltd. In the use of the surface-active agent, two or more of the surface active agents may be mixed for use.

The photochromic coating agent may contain various stabilizers such as an antioxidant, a radical scavenger, an ultraviolet ray stabilizer and the like. Among these stabilizers, it is preferred to use a hindered amine photo-stabilizer, a hindered phenol antioxidant and an ultraviolet ray absorbent from the viewpoint of preventing the photochromic compound from deterioration or improving the durability of the photochromic coat layer.

The hindered amine photo-stabilizer is specifically exemplified below. Examples of the compounds capable of exhibiting the effect of preventing the photochromic compound from deterioration are bis(1,2,2,6,6-pentamethyl-4-piperizyl)sebacate, and Adekastab LA52, LA-57, LA-62, LA-63, LA-67, LA-77, LA-82 and LA-87 manufactured by Adeka Corporation.

Examples of the hindered phenol antioxidants may include the compounds disclosed in JP-A-2005-23238, more specifically, ethylene bis(oxyethylene)bis[3-(5-t-butyl-4-hydroxy-m-tolyl)propionate], and IRGANOX 1010, 1035, 1075, 1098, 1135, 1141, 1222, 1330, 1425, 1520, 259, 3114, 3790, 5057 and 565 manufactured by Ciba Specialty Chemicals Corporation. Among them, it is preferred to use ethylene bis(oxyethylene)bis[3-(5-t-butyl-4-hydroxy-m-tolyl)propionate] from the viewpoint of improving the photochromic durability and solubility.

As the ultraviolet ray absorber, it is possible to use known benzophenone ultraviolet ray absorber, cyanoacrylate ultraviolet ray absorber and triazole type triadine ultraviolet ray absorber. Examples of the ultraviolet ray absorbers are SEESORB 501, 502, 702, 705, 706, 707, and 709 manufactured by SHIPRO Co., SUMISORB 110, 200, 300, 340, 350 and 400 manufactured by Sumitomo Chemical Co. Ltd., and TINUVIN 400, 405, 1577F, 411L, 384-2, 928 and 1130 manufactured by Ciba Specialty Chemicals Co.

Two or more of these stabilizers may be mixed for use. These additives are added in an amount of usually from 0.001 to 20 parts by mass, preferably 0.1 to 10 parts by mass, more preferably 1 to 10 parts by mass based on 100 parts by mass of all the radical polymerizing monomers.

For regulating the hue, a dye and a pigment can be also added to the photochromic coating agent. It is preferred to use an organic dye, particularly, an anthraquinone organic dye from the viewpoint of the solubility. Preferably usable examples thereof are Diaresin manufactured by Mitsubishi Chemicals Co., such as Diaresin Blue J or Diaresin Violet D, and Kayaset series manufactured by Nippon Kayaku Co., Ltd such as Kayaset Red 130 and Kayaset Blue FR. Although the amount of these dyes used herein may be appropriately determined according to the amount of the photochromic compound in order to color a cured product desired tints, the amount is generally from 0.001 to 0.03 part by mass based on 100 parts by mass of the radical polymerizing monomer.

In applying the photochromic coating agent such as the adhesive photochromic coating agent or the like on the primer layer, after the primer layer is optionally subjected to the pre-treatment same as that which can be conducted for the above described optical substrate, these coating agents may be applied on the primer layer followed by curing. The coating method in this procedure is not particularly limited. Known coating methods can be used without limitation. Specific examples of the method for applying the composition are spin coating, spray coating, dip coating and dip-spin coating. Among these methods, it is preferred to employ the spin coating because of easily controlling the film thickness and capable of preparing the coated film having good appearance.

When the primer made from the moisture curing urethane resin is used, uncoated parts where the coating agent is not adhered are caused on the primer layer surface because the blending properties affinity (wet properties) between the primer layer and the photochromic coating agent is inferior. In results, the yield is sometimes lowered. Therefore, in order to apply the photochromic coating agent in a high yield, it is necessary to take a measure of forcedly spreading the photochromic coating agent dropped on the substrate surface by the use of a flexible film. Meanwhile, since the primer layer formed using the adhesive primer made from the emulsion containing the urethane resin has good blending properties (wet properties) with the photochromic coating agent, the application with the photochromic coating agent can be carried out in a high yield even using the coating method same as the primer coating method without taking the above measure.

The thickness of the coating agent layer formed by the coating, which thickness corresponds to the thickness of the coat layer after curing, is not particularly limited. Preferably, the thickness is relatively thicker because the sufficient color concentration can be obtained even if the concentration of the photochromic compound is low, and the photochromic properties are highly durable. However, as the coating layer is thicker, the initial yellowness thereof increases. Therefore, the thickness of the coat layer prepared after curing is preferably from 10 to 100 μm, particularly 20 to 50 μm. The photochromic coating agent has a viscosity at 25° C. of preferably from 20 to 100 cP, more preferably 50 to 500 cP, furthermore preferably 70 to 250 cP in order that the coating has such a larger thickness. For example, since the coating composition such as a coating agent for hard coating that is generally applied on plastic lenses contains a solvent or the like in order to prepare a uniform coating film, the viscosity thereof at 25° C. is generally less than 5 cP, and the resulting coating layer has a thickness of less than several μm. Comparing such a thickness, the thickness of from 10 to 100 μm is very larger.

In coating the photochromic coating agent by the spin coating method, the conditions such as the kind of the nozzle, the output rate of the primer, the moving rate of the nozzle and the rotating rate of the optical substrate may be determined appropriately in accordance with the kinds of the photochromic coating agent and the optical substrate used. Specifically, when the photochromic coating agent having a viscosity at 25° C. of from 70 to 250 cP is applied on the convex lens surface having a diameter of 75 mm, it is preferred to adopt the following conditions. That is to say, the coating is preferably carried out in such conditions that the nozzle having an inner diameter of from 0.6 to 1.4 mm is used, the flow rate of the photochromic coating agent is set to be 10 to 70 cm/s and the rate of moving the nozzle from the lens center to the end is set to be 3 to 6 mm/cm. The nozzle is preferably moved while the nozzle position is regulated in accordance with the lens shape so that the distance between the nozzle tip and the lens surface is constant from 1 to 5 mm, more preferably 1 to 3 mm. Furthermore, it is preferred to regulate the rotation number within the spin rotating rate of from 50 to 150 rpm in the dropping of the photochromic coating agent in accordance with the lens diameter, the nozzle diameter and the output rate. The application of the photochromic coating agent on the surface of a 75 φ lens in these conditions can form a clear photochromic layer all over the lens surface using a small amount of the photochromic coating agent.

In accordance with the kind of the radical polymerization initiator used, a photocuring method or a thermal curing method is appropriately employed as the curing method. From the viewpoint of the physical properties and the appearance of the resulting coat film, it is preferred to adopt a method of using the photo-polymerization initiator, curing by light irradiation and completing the polymerization with heating. In the method, a thermal polymerization initiator may be used simultaneously. Examples of the light source used in the photocuring are lamps having electrodes such as a metal halide lamp, a super high pressure mercury lamp, a high pressure mercury lamp, a middle pressure mercury lamp, a bactericidal lamp, a xenon lamp, a carbon arc lamp and a tungsten lamp, and electrode-free lamps. Moreover, electron beam may be used as the light source. In the use of electron beam, the coating layer can be cured without adding the photo-polymerization initiator. Examples of the thermal curing method may include a method of thermally polymerizing with heating in a polymerization furnace, a method of curing with polymerization by irradiating infrared ray in a polymerization furnace and the like.

(Hard Coat Layer)

The substrate with the photochromic coat layer thus formed can be used as it is as an optical product such as a photochromic lens or the like, and further the photochromic coat layer is preferably covered with a hard coat layer. The scratch resistance of the optical material can be improved by covering with the hard coat layer. Known hard coat layers can be used as the hard coat layer without any limitation and examples thereof are those obtained by applying a coating agent for hard coat which comprises a silane coupling agent and a sol of a silicon, zirconium, antimony or aluminum oxide as essential components and then curing, and those obtained by applying a coating agent for hard coat which comprises an organic polymer as an essential component and curing. Using a silyl monomer in the composition, the sufficient adhesion can be attained more firmly and simply.

Moreover, on the hard coat layer, it is also possible to apply, if necessary, secondary treatment or processings such as reflection preventing treatment by vapor deposition of a thin film made from a metal oxide such as $SiO_2$, $TiO_2$ or $ZrO_2$, or by applying an organic polymer thin film, or antistatic treatment.

The present invention will be described in more detail with reference to the following examples and comparative examples, but it should be not limited by these examples.

Example 1

Preparation of Photochromic Coating Agent

Firstly, 2,2-bis(4-methacryloyloxy pentaethoxyphenyl) propane, polyethyleneglycol diacrylate having an average molecular weight of 532, trimethylolpropane trimethacrylate, polyester oligomer hexacrylate (manufactured by Dicel UCB, EB-1830), and glycidyl methacrylate, which are radical polymerizing monomers, were mixed in amounts of 50 parts by mass, 15 parts by mass, 15 parts by mass, 10 parts by mass and 10 parts by mass, respectively. Subsequently, 100 parts by mass of the radical polymerizing monomer mixture was sufficiently mixed with Chemical formula 1

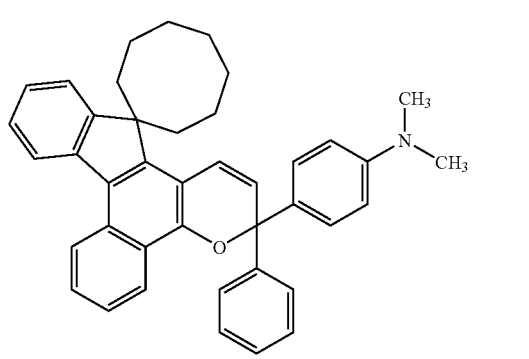

2.35 parts by mass of a photochromic compound (PC-1) having a structure represented by the above formula 1, Chemical formula 2

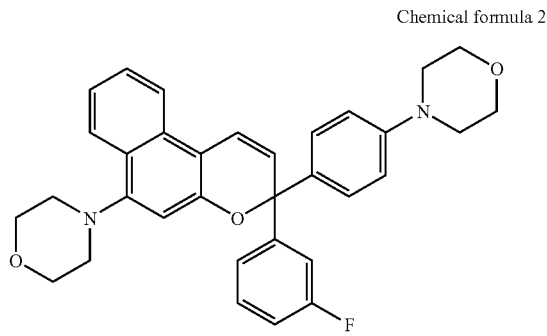 [SMILES: Fc1cccc(C2(c3ccc(N4CCOCC4)cc3)C=Cc3c(cc(N4CCOCC4)c4ccccc34)O2)c1]

0.6 part by weight of a photochromic compound (PC-2) having a structure represented by the above formula 2, and Chemical formula 3

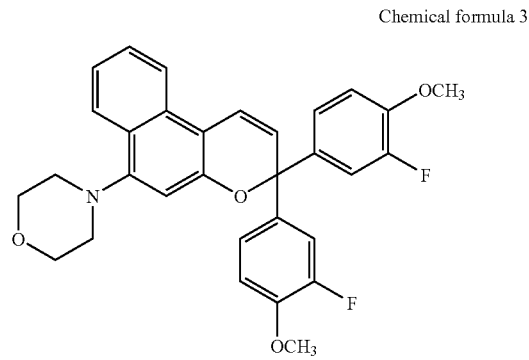 [SMILES: COc1ccc(C2(c3ccc(OC)c(F)c3)C=Cc3c(cc(N4CCOCC4)c4ccccc34)O2)cc1F]

0.4 part by mass of a photochromic compound (PC-3) having a structure represented by the above formula 3. Thereafter, the resulting mixture was sufficiently mixed with 0.5 part by mass of a mixture of 1-hydroxycyclohexylphenylketone and bis(2,6-dimethoxybenzoyl)-2,4,4-trimethyl-pentylphosphineoxide in a weight ratio of 3:1 as a polymerization initiator, 5 parts by mass of bis(1,2,2,6,6-pentamethyl-4-pyperizyl)sebacate as a stabilizer, 7 parts by mass of γ-methacryloyloxypropyl trimethoxy silane as a silane coupling agent, and 0.1 part by mass of a leveling agent "L-7001" manufactured by Nippon Unicar Co., Ltd, and thereby the photochromic coating agent was prepared.

(Formation of Primer Layer)

As a lens substrate, MR-8 having a thickness of 2.0 mm (thiourethane resin plastic lens having a refractive index of 1.60) was used. The lens substrate was thoroughly degreased with acetone and immersed in a 10% by mass sodium hydroxide aqueous solution at 50° C. for 10 min. Thereafter, the lens substrate was thoroughly washed with warm water and dried by a drying machine at 70° C. for 30 min. On the lens substrate, 2 g of a one liquid type self-crosslinking polyurethane dispersion containing a silanol group as a primer wherein the dispersing medium was water, "Takelac WS-6021" manufactured by Mitsui Chemicals Polyurethanes, INC., was applied by spin coating using a spin coater 1H-DX2 manufactured by MIKASA Co., and then naturally dried at room temperature for 15 min.

(Formation of Photochromic Layer)

Next, about 2 g of the photochromic coating agent prepared specially was applied on the surface of the lens substrate previously dried by spin coating using a spin coater 1H-DX2 manufactured by MIKASA. Through the spin coating, the coating film had a thickness such that the film thickness of the photochromic coat layer prepared after curing was 40±1 μm, by regulating the spin coat conditions. The application properties of the photochromic coating agent in the spin coating were evaluated. The photochromic coating agent had good wetting properties to the primer layer, and the coating was performed easily and uniformly. The resulting layer was evaluated as A. In this evaluation, the evaluation standards in the application properties for the photochromic coating agent are as follows.

A: The wetting properties are good and the composition can be applied on the substrate uniformly.

B: The wetting properties are somewhat no good but the composition can be applied on the substrate uniformly.

C: The wetting properties are no good and the composition is repelled on the rim of the substrate.

D: The wetting properties are no good and the composition is repelled on the center of the substrate.

Next, the lens which surface was coated in the above manner was subjected to irradiation for 3 min using a metal halide lamp with an output of 150 mW/cm² in a nitrogen gas atmosphere and thereby the photochromic coating agent-coated film was cured. Thereafter, the lens was treated with heat for 1 hr in a constant warmer at 110° C. to prepare the lens having a photochromic layer. The deformation of the substrate in the curing was observed in the following manner. The resulting lens and the lens substrate same as one used in the formation were lighted by a fluorescent and the difference of the fluorescent images which were reflected on both of the lens surfaces (the form of the image was changed or not) was observed visually. As a result, the difference between the two images (deformation) was not observed. The non-deformation of the lens was evaluated as A. In this evaluation, the evaluation standards in the non-deformation are as follows.

A: The deformation of the substrate was not observed all.

B: The deformation of the substrate was observed slightly.

C: The deformation of the substrate was observed to some extent.

D: The deformation of the substrate was observed largely.

(Evaluation of Photochromic Lens)

The lens having the photochromic layer prepared by the above method was subjected to a cross hatch adhesion test and a water resistant test, and thereby the adhesion of the photochromic coat layer was evaluated. In each test, the evaluation standards and the evaluation results are shown below.

Test Method:

On the photochromic coat layer of the lens having the photochromic layer, 100 squares having a 1 mm×1 mm size were formed by a cutter knife having a sharp tip. Successively, a commercially available cellophane tape was adhered on the squares and then the cellophane tape was quickly peeled off. After the peeling, the peeled condition of the coating layer (coat film) was observed visually. As a result, the squares of the coating layer were evaluated as A or B based on the following evaluation standards, and the coating layer was in a level capable of being used practically.

A: The squares were not peeled off.
B: Less than 5% of the squares were peeled off.
C: From not less than 5% to less than 15% of the squares were peeled off.
D: Not less than 15% of the squares were peeled off.

Water Resistant Test:

The lens having the photochromic layer was immersed in boiling water at 100° C. for 1 hr and then cooled to room temperature. The cross hatch adhesion test on the lens was carried out. As a result, it was evaluated as B based on the following evaluation standards.

A: The squares were not peeled off.
B: Less than 5% of the squares were peeled off.
C: From not less than 5% to less than 15% of the squares were peeled off.
D: Not less than 15% of the squares were peeled off.

Example 2

The procedure of Example 1 was repeated except for using, as a primer, one liquid type polyurethane dispersion having a silanol group in which a dispersing medium is water, namely commercially available "Takelac WS-5000" manufactured by Mitsui Chemicals Polyurethanes, INC., and thereby a lens having a photochromic layer was prepared. The evaluation was carried in the same manner as in Example 1. The results are summarized in Table 1-1.

Example 3

The procedure of Example 1 was repeated except for using, as a primer, a primer (A), which comprises an emulsion of a urethane resin having an acryloyloxy group dispersed in water, prepared by using polyether polyol as a compound having an active hydrogen group, and thereby a lens having a photochromic layer was prepared. The evaluation was carried in the same manner as in Example 1. The results are summarized in Table 1-1.

Example 4

The procedure of Example 1 was repeated except for using, as a primer, a primer (B), which comprises an emulsion of a urethane resin having a silanol group and an acryloyloxy group dispersed in water, prepared by using polyether polyol as a compound having an active hydrogen group, and thereby a lens having a photochromic layer was prepared. The evaluation was carried in the same manner as in Example 1. The results are summarized in Table 1-1.

Example 5

The procedure of Example 1 was repeated except for using, as a primer, a primer (C), which comprises an emulsion of a urethane resin having a silanol group and an acryloyloxy group dispersed in water, prepared by using polyether polyol as a compound having an active hydrogen group, and thereby a lens having a photochromic layer was prepared. The evaluation was carried in the same manner as in Example 1. The results are summarized in Table 1-1.

Example 6

The procedure of Example 1 was repeated except for using, as a primer, a primer (D), which comprises an emulsion of a urethane resin having a silanol group, an acryloyloxy group and a crosslinking part having at least three functional groups dispersed in water, prepared by using polyether polyol as a compound having an active hydrogen group, and thereby a lens having a photochromic layer was prepared. The evaluation was carried in the same manner as in Example 1. The results are summarized in Table 1-1.

Example 7

The procedure of Example 1 was repeated except that, a mixture of one liquid type self-crosslinking polyurethane dispersion having a silanol group, namely commercially available "Takelac WS-5100" manufactured by Mitsui Chemicals Polyurethanes, INC., with the primer (A) in a solid-concentration ratio of 1:1 was used as a primer, and after the coating of the photochromic coat layer, the thermal curing was carried out at 90° C. for 1 hr, and thereby a lens having a photochromic layer was prepared. The evaluation was carried in the same manner as in Example 1. The results are summarized in Table 1-1.

Example 8

The procedure of Example 7 was repeated except for using a mixture of one liquid type self-crosslinking polyurethane dispersion having a silanol group, namely commercially available "Takelac WS-6021" manufactured by Mitsui Chemicals Polyurethanes, INC., with the primer (A) in a solid concentration ratio of 1:1, as a primer, and thereby a lens having a photochromic layer was prepared. The evaluation was carried in the same manner as in Example 7. The results are summarized in Table 1-1.

Example 9

The procedure of Example 1 was repeated except for using a polycarbonate lens substrate having a thickness of 2 mm as a lens substrate, and the primer (D) as a primer component, and thereby a lens having a photochromic layer was prepared. The evaluation was carried in the same manner as in Example 1. The results are summarized in Table 1-1.

Example 10

The procedure of Example 1 was repeated except for adding 3 parts by weight of N-methyldiethanol amine to the photochromic polymerizing composition, and thereby a lens having a photochromic layer was prepared. The evaluation was carried in the same manner as in Example 1. The results are summarized in Table 1-2.

Example 11

The procedure of Example 6 was repeated except for using, as a plastic lens substrate, MR-8 substrate (thiourethane resin plastic lens) having a center thickness of 1.2 mm, a periphery thickness of 10 mm, a diameter of 75 mm and a refractive index of 1.60, and thereby a lens having a photochromic layer was prepared. The evaluation was carried in the same manner as in Example 6. The results are summarized in Table 1-2.

Example 12

The procedure of Example 6 was repeated except for using, as a plastic lens substrate, CR-39 substrate (acryl resin plastic lens) having a center thickness of 1.2 mm, a periphery thickness of 10 min, a diameter of 75 mm and a refractive index of 1.50, and thereby a lens having a photochromic layer was prepared. The evaluation was carried in the same manner as in Example 6. The results are summarized in Table 1-2.

Example 13

The procedure of Example 6 was repeated except for applying the photochromic coating solution after the primer coating and drying with heat at 120° C. for 1 hr, and thereby a lens having a photochromic layer was prepared. The evaluation was carried in the same manner as in Example 6. The results are summarized in Table 1-2.

TABLE 1-1

| | | Primer | | | |
|---|---|---|---|---|---|
| Example | Name | Functional group | Resin | Self or Forced emulsification | Average particle diameter (mm) |
| 1 | Takelac WS-6201 | Si—OH | Polyether | Self emulsification | 90 |
| 2 | Takelac WS-5000 | Si—OH | Polyester | Self emulsification | 70 |
| 3 | (A) | CH2=CHC(O)O— | Polyether | Self emulsification | 60 |
| 4 | (B) | Si—OH CH2=CHC(O)O— | Polyether | Self emulsification | 70 |
| 5 | (C) | Si—OH CH2=CHC(O)O— | Polyether | Self emulsification | 90 |
| 6 | (D) | Si—OH CH2=CHC(O)O— | Polyether having a crosslinking structure caused by 3 functional groups | Self emulsification | 70 |
| 7 | Takelac WS-5100 (A) | Si—OH CH2=CHC(O)O— | Polycarbonate Polyether | Self emulsification | 60 60 |
| 8 | Takelac WS-6201 (A) | Si—OH CH2=CHC(O)O— | Polyether Polyether | Self emulsification | 90 60 |
| 9 | (D) | Si—OH CH2=CHC(O)O— | Polyether having a crosslinking structure caused by 3 functional groups | Self emulsification | 70 |

| | | Evaluation Results on Physical properties | | | |
|---|---|---|---|---|---|
| Example | Substrate lens | Photochromic coating application properties | Lens deformation | Adhesion | Water resistance |
| 1 | Thiourethane | A | A | B | B |
| 2 | Thiourethane | A | A | B | B |
| 3 | Thiourethane | A | A | A | B |
| 4 | Thiourethane | A | A | A | B |
| 5 | Thiourethane | A | A | A | B |
| 6 | Thiourethane | A | A | A | A |
| 7 | Thiourethane | A | A | A | B |
| 8 | Thiourethane | A | A | A | B |
| 9 | Polycarbonate | A | A | A | A |

TABLE 1-2

| Example | Primer Name | Functional group | Resin | Self or Forced emulsification | Average particle diameter (mm) |
|---|---|---|---|---|---|
| 10 | Takelac WS-6201 | Si—OH | Polyether | Self emulsification | 90 |
| 11 | (D) | Si—OH CH2=CHC(O)O— | Polyether having a crosslinking structure caused by 3 functional groups | Self emulsification | 70 |
| 12 | (D) | Si—OH CH2=CHC(O)O— | Polyether having a crosslinking structure caused by 3 functional groups | Self emulsification | 70 |
| 13 | (D) | Si—OH CH2=CHC(O)O— | Polyether having a crosslinking structure caused by 3 functional groups | Self emulsification | 60 |
| 14 | Takelac WS-6201 | Si—OH | Polyether | Self emulsification | 90 |
| 15 | (E) | Si—OH CH2=CHC(O)O— | Polycarbonate having a crosslinking structure caused by 3 functional groups | Self emulsification | 90 |
| 16 | (F) | CH2=CHC(O)O— | Polycarbonate having a crosslinking structure caused by 3 functional groups | Self emulsification | 90 |
| 17 | Takelac WS-6010 | — | Polycarbonate | Self emulsification | 60 |
| 18 | (E) | Si—OH CH2=CHC(O)O— | Polycarbonate having a crosslinking structure caused by 3 functional groups | Self emulsification | 90 |
| 19 | (E) | Si—OH CH2=CHC(O)O— | Polycarbonate having a crosslinking structure caused by 3 functional groups | Self emulsification | 90 |
| 20 | (G) | CH2=OMeC(O)O— | Polycarbonate having a crosslinking structure caused by 3 functional groups | Self emulsification | 90 |

| Example | Substrate lens | Photochro coating application properties | Lens deformation | Adhesion | Water resistance |
|---|---|---|---|---|---|
| 10 | Thiourethane | A* | A* | A* | A* |
| 11 | Thiourethane 1.2 mm thick | A | A | A | A |
| 12 | Allyl 1.2 mm thick | A | A | A | A |
| 13 | Thiourethane | A | A | A | A |
| 14 | Thiourethane | A | A | B | B |
| 15 | Thiourethane | A | A | A | A |
| 16 | Poly-carbonate | A | A | A | A |
| 17 | Thiourethane | A | A | C | D |
| 18 | Poly-carbonate | A | A | A | A |
| 19 | Poly-carbonate | A | A | A | A |
| 20 | Poly-carbonate | A | A | A | A |

*The amine compound-containing photochromic coating agent was used.

Comparative Example 1

The procedure of Example 1 was repeated except for using, as a primer component, a mixture preparing by mixing a moisture-curing type primer, namely, "Takenate M-402P" manufactured by Mitsui Chemicals polyurethanes, INC., and butyl acetate in a weight ratio of 1:1 and making them uniform with thoroughly stirring in a nitrogen atmosphere, and thereby a lens having a photochromic layer was prepared. The evaluation of the lens was carried in the same manner as in Example 1. The results are summarized in Table 2.

Comparative Example 2

The procedure of Example 1 was repeated except for directly applying the photochromic coating agent on the substrate without using the primer, and thereby a lens having a photochromic layer was prepared. The evaluation was carried in the same manner as in Example 1. The results are summarized in Table 2.

Comparative Example 3

The procedure of Example 10 was repeated except for using, as a plastic lens substrate, MR-8 substrate (thiourethane resin plastic lens) having a center thickness of 1.2 mm, a periphery thickness of 10 mm, a diameter of 75 mm and a refractive index of 1.60, without using the primer, and thereby a lens having a photochromic layer was prepared. The evaluation of the lens was carried in the same manner as in Example 10. The results are summarized in Table 2. In this comparative example, since the primer layer made from the urethane resin was not present, the stress induced according to the shrinkage caused by polymerization curing of the photochromic coating agent could not be relaxed in the light irradiation for forming the photochromic coat layer. Therefore, the substrate, which was softened by heating with light irradiation, was deformed. Moreover, the water resistance of the lens was evaluated as E.

TABLE 2

| Compar. Ex. | Primer | Substrate lens | Photochromic coating application properties | Lens deformation | Adhesion | Water resistance |
|---|---|---|---|---|---|---|
| 1 | Moisture-curing type: Takenate M-402P | Thiourethane | D | A | A | A |
| 2 | ↑ | ↑ | A | A | E | E |
| 3 | — | Thiourethane thickness (1.2 mm) | A* | D* | B* | E* |

*An amine compound-containing photochromic coating agent was used.

Example 14

Formation of Primer Layer

As a lens substrate, MR-8 having a diameter of 75 mm, a curve of 5 and a thickness of 2.0 mm (thiourethane resin plastic lens having a refractive index of 1.60) was used. The lens substrate was thoroughly degreased with acetone and immersed in a 10% by mass sodium hydroxide aqueous solution at 50° C. for 10 min. Thereafter, the lens substrate was thoroughly washed with warm water and dried at room temperature for 30 min. On the lens substrate, 2 g of a one liquid type self-crosslinking polyurethane dispersion containing a silanol group as a primer, "Takelac WS-6021" manufactured by Mitsui Chemicals Polyurethanes, INC. was applied by spin coating using a spin coater 1H-DX2 manufactured by MIKASA Co.

(Spin Coating of Primer)

While a lens having a diameter of 75 mm was rotated at 70 rpm using a spin coater 1H-DX2 manufactured by MIKASA Co., the primer was dispensed on the center of the lens at an output rate of 0.17 g/s using a dispenser with a nozzle having an inner diameter of 0.4 mm. Thereafter, the primer solution was dropped over 8 min while the dispenser was moved from the lens center to the lens periphery. The nozzle was moved while regulating the moving locus so that the distance to the lens was kept to be from 1 to 3 mm. Thereafter, the lens was naturally dried at room temperature for 15 min.

(Formation of Photochromic Layer)

Next, about 2 g of the photochromic coating agent prepared in the same manner as Example 1 was applied on the surface of the lens substrate previously dried, by spin coating using a spin coater 1H-DX2 manufactured by MIKASA.

(Spin Coating of Photochromic Coat)

While a lens having a diameter of 75 mm was rotated at 50 rpm, the photochromic coating agent was dispensed on the center of the lens at an output rate of 0.17 g/s using a dispenser with a nozzle having an inner diameter of 0.8 mm. Thereafter, the dispenser was moved from the lens center to the lens periphery over 8 min. The nozzle was moved while regulating the moving locus so that the distance to the lens was kept to be from 1 to 3 mm. Through the spin coating, the coating film had a thickness such that the film thickness of the photochromic coat layer prepared after curing was 40±1 μm, by regulating the spin coat conditions. The application properties of the photochromic coating agent in the spin coating were evaluated. The photochromic coating agent had good wetting properties to the primer layer, and the coating was performed easily and uniformly. The resulting layer was evaluated as A.

Next, the lens which surface was coated in the above manner was subjected to irradiation for 3 min using a metal halide lamp with an output of 150 mW/cm$^2$ in a nitrogen gas atmosphere and thereby the photochromic coating agent-coated film was cured. Thereafter, the lens was treated with heat for 1 hr in a constant warmer at 110° C. to prepare a lens having a photochromic layer. The deformation of the substrate in the curing was observed in the following manner. The resulting lens and the same lens substrate as one used in the formation were held to a fluorescent and the difference of the fluorescent images which were reflected on both of the lens surfaces (the form of the image was changed or not) was observed visually. As a result, the difference between the two images (deformation) was not observed. The non-deformation of the lens was evaluated as A. The results are summarized in Table 1-2.

Example 15

The procedure of Example 1 was repeated except for using, as a lens substrate, MR-7 having a diameter of 75 mm, a curve of 5 and a thickness of 2.0 mm (thiourethane resin plastic lens having a refractive index of 1.67), and using, as a primer component, a primer (E), which comprises an emulsion in which water containing a urethane resin having a silanol group, an acryloyloxy group and a crosslinking part of at least three functional groups is used as a dispersing medium, prepared by using polycarbonate polyol as a compound having an active hydrogen group, and thereby a lens having a photochromic coat layer was prepared. The evaluation was carried in the same manner as in Example 14. The results are summarized in Table 1-2.

Comparative Example 4

The procedure of Example 14 was repeated except for using a primer prepared by using, as a primer component, a moisture curing type primer "Takenate M-402P" manufactured by Mitsui Chemicals Polyurethanes, INC. mixing the primer with butyl acetate in a weight ratio of 1:1 and making them uniform with thoroughly stirring in a nitrogen atmosphere, and thereby a lens having a photochromic coat layer was prepared. However, in the spin coating without forcedly extending by using a flexible film, uncoated parts where the coating agent is not adhered are caused on the primer layer surface because the wetting properties of the photochromic coating agent to the primer layer were inferior. In results, a good photochromic coat layer could not be prepared.

Example 16

The procedure of Example 1 was repeated except for using, as a lens substrate, a polycarbonate lens substrate having a diameter of 75 mm, a curve of 5 and a thickness of 2.0 mm, and using, as a primer component, a primer (F) having an acryloyloxy group and a crosslinking part having at least three functional groups, prepared by using polycarbonate polyol as a compound having an active hydrogen group, and thereby a lens having a photochromic coat layer was prepared. The evaluation was carried in the same manner as in Example 14. The results are summarized in Table 1-2.

Example 17

The procedure of Example 1 was repeated except for using, as a lens substrate, MR-8 having a thickness of 2.0 mm (thiourethane resin plastic lens having a refractive index of 1.60), and using one liquid type polyurethane dispersion "Takelac W-6010" which did not contain a specific functional group and a crosslinking part having at least three functional groups, as a primer component manufactured by Mitsui Chemicals Polyurethanes, INC. The evaluation was carried in the same manner as in Example 1. The results are summarized in Table 1-2.

Example 18

The procedure of Example 1 was repeated except for using, as a photochromic compound, 0.5 part by mass of 1',5'-dimethyl-6'-fluoro-6'-morphorinodispiro(cyclohexane-1,3')-(3H)indole-2'-(2H),3"(3H)naphto(3,2-a)(1,4)oxazine, 1 part by mass of PC-1, and 1 part by mass of PC-2, and further adding, as a stabilizer, 5 parts by mass of benzenepropanoic acid, 3-(2-Hbenzotriazole-2-yl)-5-(1,1-dimethylethyl)-4-hydroxy, C 7-9 side chain and straight chain alkyl ester, and thereby a photochromic coating agent was prepared. Thereafter, the procedures of Example 15 was repeated except for using the photochromic coating agent thus prepared, and thereby a primer layer and a photochromic coat layer were formed and evaluated. As a result, the application properties of the photochromic coating agent, the lens deformation, the adhesion and the water resistance were evaluated as A respectively.

Example 19

The procedure of Example 1 was repeated except for further adding, as a stabilizer, 5 parts by mass of ethylenebis(oxyethylene)bis[3-(5-t-butyl-4-hydroxy-m-tolyl)propionate], and thereby a photochromic coating agent was prepared. Thereafter, the procedures of Example 15 was repeated except for using the photochromic coating agent thus prepared, and thereby a primer layer and a photochromic coat layer were formed and evaluated. As a result, the application properties of the photochromic coating agent, the lens deformation, the adhesion and the water resistance were evaluated as A respectively.

Example 20

The procedure of Example 16 was repeated except for except for using, as a primer component, a primer (C), which comprises an emulsion of an urethane resin having a silanol group, a methacryloyloxy group and a crosslinking part having at least three functional groups dispersed in water, prepared by using polycarbonate polyol as a compound having an active hydrogen group, and thereby a lens having a photochromic coat layer was prepared. The evaluation was carried out in the same manner in Example 16. As a result, the application properties of the photochromic coating agent, the lens deformation, the adhesion and the water resistance were evaluated as A, respectively.

The invention claimed is:

1. A process for producing an optical article comprising a laminate structure consisting of an optical substrate, a photochromic layer formed from a coating solution containing a radical polymerizing monomer, a compound having a silanol group or a group capable of preparing a silanol group by hydrolysis and a photochromic compound and a primer layer therebetween, wherein the surface of the optical substrate and the photochromic layer are bonded through the primer layer, and wherein said radical polymerizing monomer excludes (i) monomers having a silanol group or monomers having a group capable of preparing a silanol group by hydrolysis and (ii) monomers having a maleimide group, which process comprises the steps of:

(A) forming the primer layer on the surface of the optical substrate by applying a primer comprising an emulsion containing a dispersed urethane resin in a colloidal particle state or a more bulky particle state in water or a dispersing medium which comprises a mixture of an organic solvent having high affinity with water and water; and (B) forming the photochromic layer on the primer layer formed in the step (A);

wherein the primer is an emulsion comprising a urethane resin having a silanol group and at least one group selected from the group consisting of an acryloyloxy group and a methacryloyloxy group.

2. The process for producing an optical article according to claim 1 wherein the primer is an emulsion comprising a urethane resin having a skeleton derived from polycarbonate polyol which is obtained by allowing a compound having isocyanate groups present in the molecule to react with a compound having active hydrogen containing a polycarbonate polyol.

3. The process for producing an optical article according to claim 1 wherein in the step (A), the primer layer is formed by applying the primer with spin coating, and in the step (B), the photochromic coat layer is formed by applying the photochromic coating agent solution with spin coating.

4. The process for producing an optical article according to claim 1, wherein the primer layer formed after drying has a thickness of 5 to 9 μm.

5. The process for producing an optical article according to claim 1,
wherein the photochromic layer is formed by applying the coating solution free from an amine compound; and
wherein the primer is an emulsion comprising a urethane resin having at least one group selected from the group consisting of an acryloyloxy group and a methacryloyloxy group.

* * * * *